United States Patent
Farooq et al.

(12) 
(10) Patent No.: US 10,246,144 B2
(45) Date of Patent: Apr. 2, 2019

(54) VEHICLE SPARE TIRE LIFT ASSEMBLY

(71) Applicant: Ford Global Technologies, LLC, Dearborn, MI (US)

(72) Inventors: S. M. Iskander Farooq, Novi, MI (US); Mohammed Omar Faruque, Ann Arbor, MI (US); Dean M. Jaradi, Macomb, MI (US); Scott Holmes Dunham, Redford, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/141,334

(22) Filed: Sep. 25, 2018

(65) Prior Publication Data

US 2019/0023332 A1    Jan. 24, 2019

Related U.S. Application Data

(62) Division of application No. 15/411,081, filed on Jan. 20, 2017, now Pat. No. 10,112,660.

(51) Int. Cl.
| | |
|---|---|
| *B62D 43/00* | (2006.01) |
| *B62D 43/10* | (2006.01) |
| *B62D 43/06* | (2006.01) |

(52) U.S. Cl.
CPC ........... *B62D 43/002* (2013.01); *B62D 43/06* (2013.01); *B62D 43/10* (2013.01)

(58) Field of Classification Search
CPC ................................................... B62D 43/002
USPC ................................................. 294/165, 166
See application file for complete search history.

(56) References Cited

U.S. PATENT DOCUMENTS

| | | | |
|---|---|---|---|
| 2,420,854 | A | 5/1947 | Black |
| 2,676,831 | A * | 4/1954 | Scuderi ................. B60B 29/001 294/15 |
| 3,724,731 | A | 4/1973 | Potgieter et al. |
| 4,042,158 | A | 8/1977 | Cole |
| 4,106,681 | A | 8/1978 | Bolt |
| 5,568,956 | A | 10/1996 | Benefield |
| 5,871,327 | A | 2/1999 | McWha |
| 5,951,232 | A | 9/1999 | Yu et al. |
| 6,012,211 | A | 1/2000 | Ochoa et al. |
| 6,155,323 | A * | 12/2000 | Gougelet .............. B60C 25/147 157/1 |

(Continued)

FOREIGN PATENT DOCUMENTS

KR      0126276 B1    4/1998

*Primary Examiner* — Justin Larson
(74) *Attorney, Agent, or Firm* — Vichit Chea; Brooks Kushman P.C.

(57) ABSTRACT

A tire lift assembly including a body and a pair of moveable arms is provided. The body may include two handles. Each of the moveable arms extends from the body. Each arm may have an end to grasp a vehicle tire when in a first position and to release the vehicle tire when in a second position. Each of the movable arms may extend from the body at a living hinge to facilitate movement of each of the moveable arms. The body may be of a flexible material to facilitate movement of each of the pair of moveable arms. The body may further define a pair of handle through-holes. Each of the pair of handle through-holes may be located adjacent one of the two handles. Each of the pair of handle through-holes may be located adjacent a living hinge to facilitate pivotal movement of each of the moveable arms.

6 Claims, 5 Drawing Sheets

(56) References Cited

U.S. PATENT DOCUMENTS

| | | | |
|---|---|---|---|
| 6,298,535 | B1 | 10/2001 | Lower |
| 6,341,411 | B1 | 1/2002 | Lower |
| 7,000,812 | B2 * | 2/2006 | Gilstrap .............. B62D 43/005 224/417 |
| D588,975 | S * | 3/2009 | Spater ......................... D12/202 |
| 8,840,000 | B1 | 9/2014 | Simpson |
| 9,932,075 | B1 | 4/2018 | Koenig et al. |
| 2012/0048897 | A1 | 3/2012 | Fowler et al. |
| 2018/0086135 | A1 | 3/2018 | Prezecki |

* cited by examiner

VEHICLE SPARE TIRE LIFT ASSEMBLY

CROSS-REFERENCE TO RELATED APPLICATION

This application is a divisional of application Ser. No. 15/411,081, filed Jan. 20, 2017, now U.S. Pat. No. 10,112,660, the disclosure of which is hereby incorporated in its entirety by reference herein.

TECHNICAL FIELD

This disclosure relates to an assembly for assisting in moving a vehicle spare tire from a stowed position.

BACKGROUND

A spare tire for a vehicle is commonly stored in a vehicle trunk. Removing the spare tire to replace a failed tire is often a cumbersome task. The weight and bulkiness of the spare tire may make it difficult to remove the spare tire from the trunk and mount the spare tire on the vehicle.

SUMMARY

A tire lift assembly includes an upper plate, an intermediate plate, a bottom plate, a rod, and a pair of handles. The rod extends through the plates and is removably attached to the bottom plate. The pair of handles each includes a tab disposed at a lower handle portion and each is mounted to the upper plate and intermediate plate for rotation between first and second positions. The upper plate and bottom plate are spaced from one another to receive a spare tire therebetween and each of the tabs extends from the respective handle to engage the spare tire when the handles are in the second position. The upper plate and the rod may be arranged with one another so that the upper plate and the bottom plate are disconnected from one another when the rod is not secured to the bottom plate. The rod and the bottom plate may be arranged with one another so that the upper plate exerts a force against a rim of the spare tire when the rod is tightened. The upper plate may define a length greater than a diameter of rim through-hole of the spare tire. The rod may be rotatably attached to the upper plate and the intermediate plates so that the rod may rotate for engagement with the bottom plate. The rod may include a first end, a second end, and a head at one of the first end and the second end sized for a user to grasp and rotate the rod for tightening and loosening the rod within an aperture of the bottom plate. Each of the handles may be arranged with the upper plate so that the tabs define a dimension greater than a diameter of a rim through-hole of the tire when the tabs are rotated for engagement with the tire in the second position.

A tire lift assembly includes an upper plate, a rod, and a pair of handles. The rod connects the upper plate to a trunk support surface spaced from the upper plate to receive a tire therebetween. Each of the pair of handles is mounted for rotation to the upper plate and each includes a tab. Rotation of each of handles orients the respective tab for engagement and non-engagement with the tire. Each of the handles may be arranged with the upper plate so that the tabs define a dimension greater than a diameter of a rim through-hole of the tire when the tabs are rotated for engagement with the tire. The trunk support surface may be a bottom plate secured to a lower surface of a vehicle trunk. The trunk support surface may be a lower surface of a vehicle trunk. An intermediate plate may be disposed between the upper plate and the trunk support surface and may be rotatably secured to the handles. The upper plate may define a length greater than a diameter of rim through-hole of the tire.

A tire lift assembly includes a body and a pair of moveable arms. The body includes two handles. Each of the moveable arms extends from the body. Each arm has an end to grasp a vehicle tire when in a first position and to release the vehicle tire when in a second position. Each of the movable arms may extend from the body at a living hinge to facilitate movement of each of the moveable arms. The body may be of a flexible material to facilitate movement of each of the pair of moveable arms. The body may further define a pair of handle through-holes. Each of the pair of handle through-holes may be located adjacent one of the two handles. Each of the pair of handle through-holes may be located adjacent a living hinge to facilitate pivotal movement of each of the moveable arms. The body may define an axle through-hole at a location on the body for alignment with a rim through-hole of the vehicle tire. The body may further define one or more bolt through-holes spaced from one another to receive vehicle bolts at a vehicle tire mount location.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
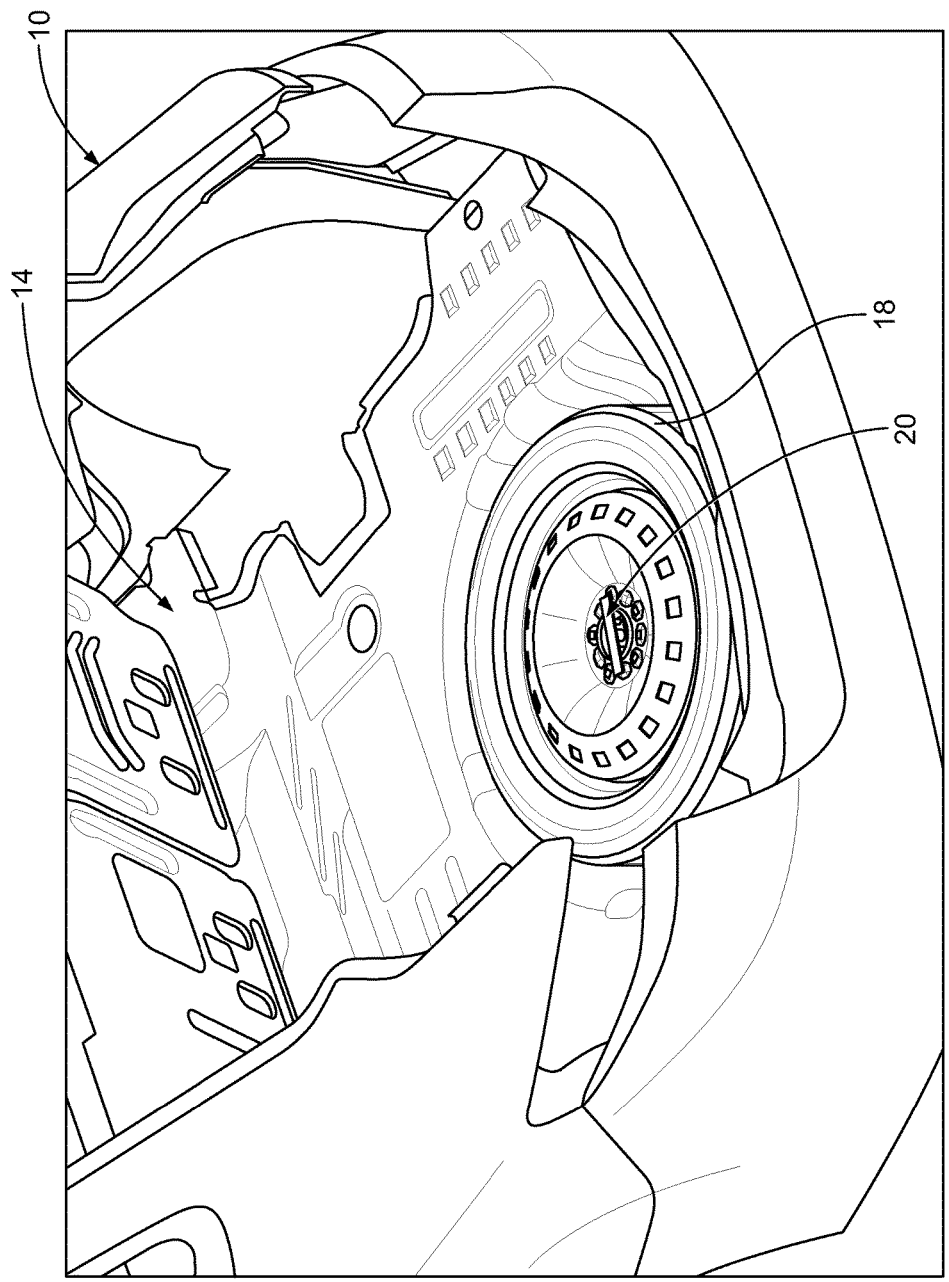
FIG. 1 is a fragmentary rear perspective view of a portion of an example of a vehicle showing a spare tire disposed within a vehicle trunk.

FIG. 1 shows an example of a portion of a vehicle body, generally referred to as a vehicle body 10 herein. The vehicle body 10 defines a trunk cavity 14. The trunk cavity 14 is sized to receive a spare tire 18. The spare tire 18 may be mounted within the trunk cavity 14. For example, the trunk cavity 14 may include a depression to receive the spare tire 18 so that an upper portion of the spare tire 18 is below or flush with a lower surface of the trunk cavity 14. A lock assembly 20 removably secures the spare tire 18 within the trunk cavity 14.

Figure 2:
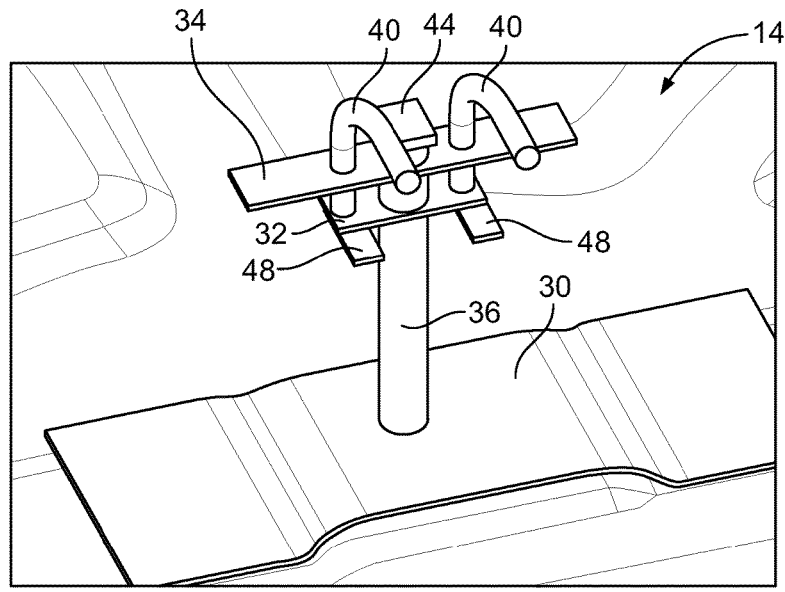
FIG. 2 is a perspective view of an example of a lift assembly for a spare tire of a vehicle showing a pair of handles in a first position.
Figure 3:
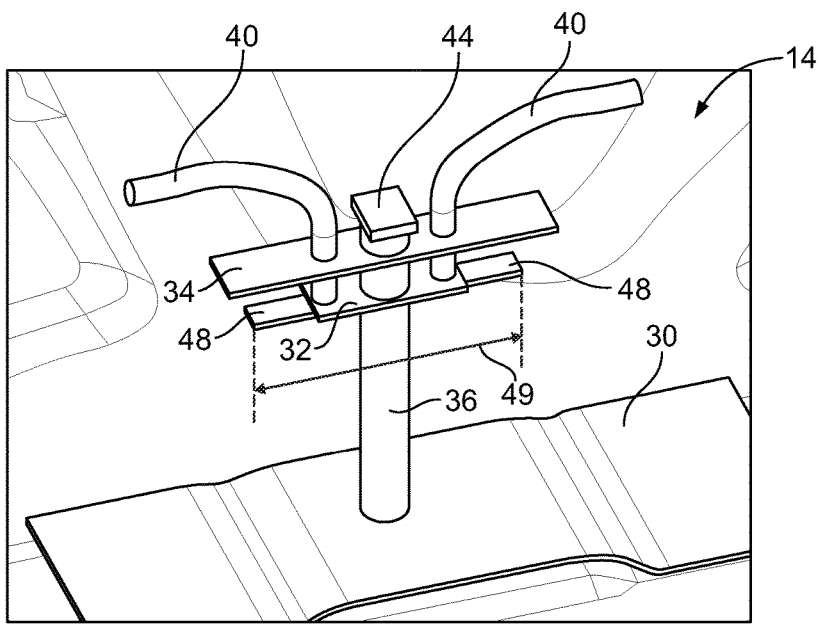
FIG. 3 is a perspective view of the example of the lift assembly of FIG. 2 showing the pair of handles in a second position.

FIGS. 2 and 3 show an example of an axle opening lift assembly 22. The lift assembly 22 includes a bottom plate 30, an intermediate plate 32, an upper plate 34, a rod 36, and a pair of handles 40. The bottom plate 30 is mounted to the lower surface of the trunk cavity 14. The intermediate plate 32 may provide additional strength to the lift assembly 22 by supporting the pair of handles 40. The rod 36 extends from the bottom plate 30 and may include a head 44. The rod 36 may include a threaded portion at a lower end for insertion into and securement within a threaded cavity (not shown) defined by the bottom plate 30. Alternatively, the lift assembly 22 may not include the bottom plate 30 and a lower surface of the trunk cavity 14 may include a threaded aperture to receive the threaded portion of the rod 36. The head 44 may be sized to assist a user in rotation of the rod 36 to disengage the rod 36 from the bottom plate 30 or the surface of the trunk cavity 14.

Each of the pair of handles 40 extends through the intermediate plate 32 and the upper plate 34 and is mounted for rotation. For example, FIG. 2 shows the pair of handles 40 oriented in a first position and FIG. 3 shows the pair of handles 40 oriented in a second position. Each of the pair of handles 40 includes a tab 48 secured to a lower portion to rotate with the respective handle between the first and second positions. The tabs 48 define a dimension 49 greater than a diameter of a rim through-hole of the spare tire 18 when oriented in the second position. It is contemplated that each of the tabs 48 may be arranged with the respective handle 40 in alternative configurations. For example, each of the tabs 48 may be offset from the respective handle 40 approximately ninety degrees such that the first and second positions are flip-flopped relative to the orientation of the handles 40.

Figure 4:
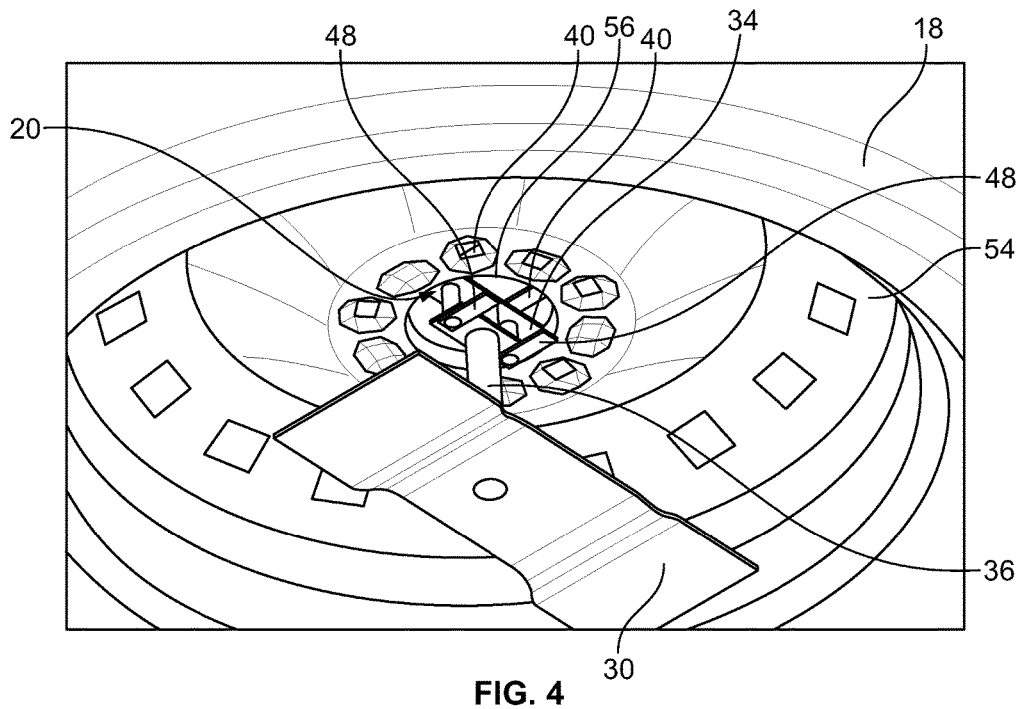
FIG. 4 is a lower perspective view of the example of the lift assembly of FIG. 2 and a spare tire showing the pair of handles in the first position.
Figure 5:
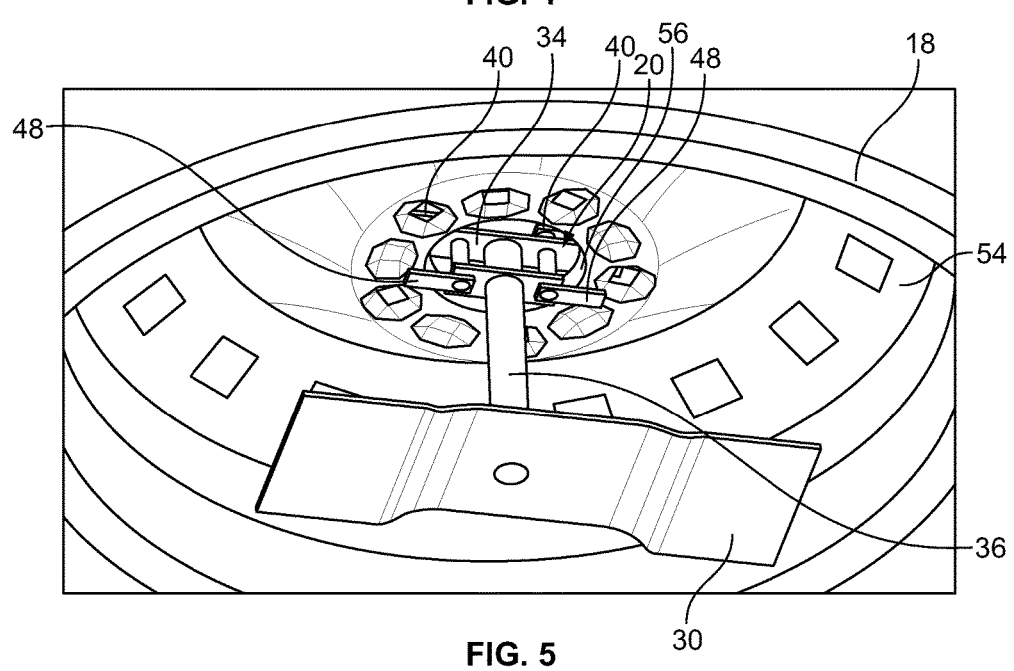
FIG. 5 is a lower perspective view of the example of the lift assembly of FIG. 2 and the spare tire of FIG. 4 showing the pair of handles in the second position.

FIGS. 4 and 5 are lower perspective views of the lift assembly 22 and the spare tire 18. The upper plate 34 and the bottom plate 30 are spaced from one another to receive the spare tire 18 therebetween. In FIG. 4, each of the pair of handles 40 and the tabs 48 is shown oriented in the first position. In FIG. 5, each of the pair of handles 40 and the tabs 48 are shown oriented in the second position. In the second position, the handles 40 and the tabs 48 are shown rotated such that each of the tabs 48 engages with a rim 54 of the spare tire 18. For example, each of the tabs 48 is oriented to extend past a rim through-hole 56 to engage with the rim 54 when the tabs 48 are oriented in the second position.

Figure 6:
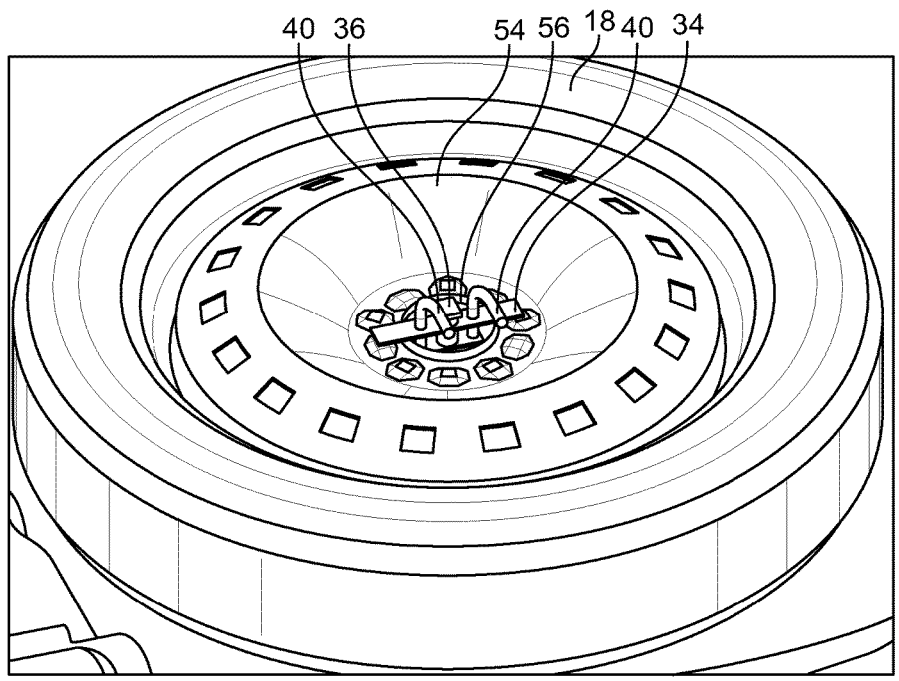
FIG. 6 is an upper perspective view of the example of the lift assembly of FIG. 2 showing the spare tire of FIG. 4 mounted within a vehicle trunk and the pair of handles in the first position.
Figure 7:
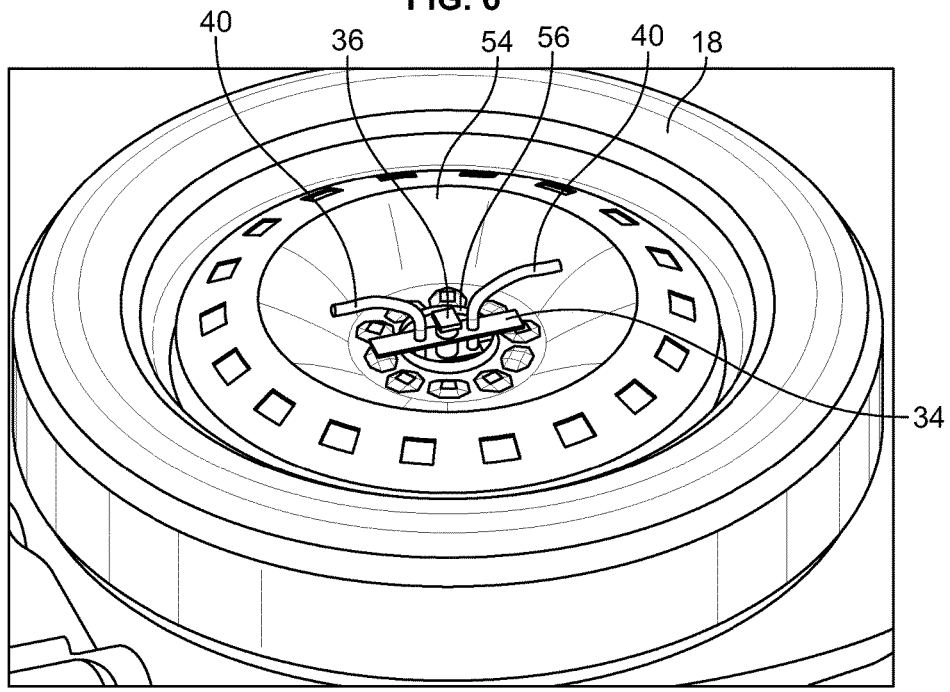
FIG. 7 is an upper perspective view of the example of the lift assembly of FIG. 2 showing the spare tire of FIG. 4 mounted within a vehicle trunk and the pair of handles in the second position.

FIGS. 6 and 7 are upper perspective views of the lift assembly 22 and the spare tire 18. FIG. 6 shows the pair of handles 40 oriented in the first position and FIG. 7 shows the pair of handles 40 oriented in the second position. The upper plate 34 defines a length greater than a diameter of the rim through-hole 56 to assist in securing the spare tire 18 within the trunk cavity 14. For example, rotation of the rod 36 in a first direction secures the upper plate 34 against the rim 54 of the spare tire 18 and thus secures the spare tire 18 upon the bottom plate 30 or the lower surface of the trunk cavity 14. Rotation of the rod 36 in a second direction disengages the upper plate 34 from the rim 54 to remove the spare tire 18 from the trunk cavity 14.

For example, after disengaging the rod 36, when the handles 40 and tabs 48 are oriented in the second position such that the tabs 48 are engaged with the rim 54, a user may lift the spare tire 18 by the handles 40. The user may move the spare tire 18 to replace a failed tire. The handles 40 may further assist in mounting the spare tire 18 to the vehicle. The upper plate 34, the handles 40, and the tabs 48 will remain engaged with the rim until the user rotates the handles to the first position such that the tabs 48 may be moved through the rim through-hole 56.

Figure 8:
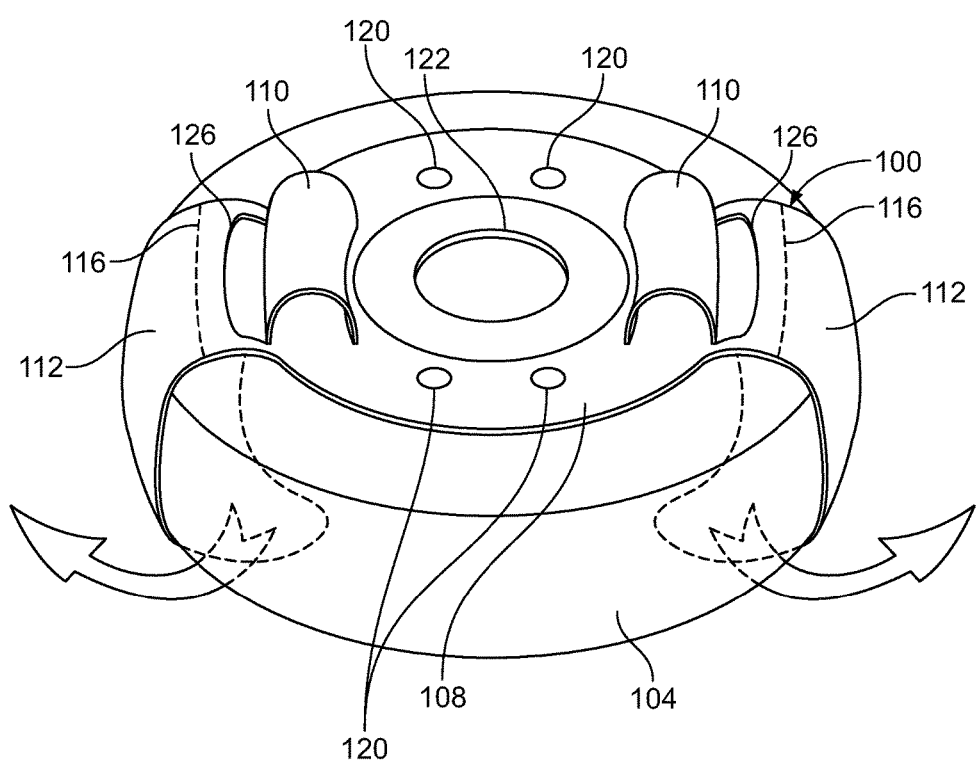
FIG. 8 is a perspective view of an example of a lift assembly for a spare tire of a vehicle shown mounted to a spare tire.

FIG. 8 shows an example of a tire outer periphery lift assembly, referred to generally as a lift assembly 100 herein. The lift assembly 100 is shown mounted to a spare tire 104. The lift assembly 100 and the spare tire 104 may be sized for disposal within a trunk cavity, such as the trunk cavity 14 (shown in FIG. 1). The lift assembly 100 includes a body 108, a pair of handles 110, and a pair of arms 112. One of each of a pair of living hinges 116 may be disposed between the body 108 and one of the arms 112. The living hinges 116 provide flexible movement for the arms 112 to assist in mounting the lift assembly 100 to the spare tire 104. For example, each of the arms 112 may pivot along the respective living hinge 116 between at least an engaged position grasping the spare tire 104 and a disengaged position in which the lift assembly is not grasping the spare tire 104. The lift assembly 100 may be of a flexible material to facilitate movement of each of the arms 112 such that living hinges 116 are not necessary.

The body 108 may define through-holes 120 spaced from one another to receive bolts from a vehicle axle. The body 108 may define a central through-hole 122 sized to receive a portion of a vehicle axle. The central through-hole 122 may be located upon the body 108 for substantial registration of a rim through-hole of the spare tire 104. A user may lift the spare tire 104 from a stowed position by the handles 110 and move the spare tire 104 to the desired vehicle tire mount location. The body 108 may further define a pair of handle through-holes 126 adjacent the handles 110 such that a user may grasp the body 108 by the handles 110. Once the spare tire 104 is mounted, each of the arms 112 may be pivoted to the disengaged position to release the spare tire 104 from the lift assembly 100.

The lift assemblies 22 and 100 provide an apparatus to assist in removing a spare tire from a vehicle trunk and mounting the spare tire upon a vehicle tire mount location to replace a failed tire. Handles of the lift assemblies provide an option for a user to move the tire without having to directly contact the rubber portion of the tire. Each of the lift assemblies may also be mounted to the failed tire to assist in lifting the same and placing the failed tire in the vehicle trunk.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A tire lift assembly comprising:
a body including two handles; and
a pair of moveable arms each extending from the body at a living hinge, wherein each arm has an end to grasp a vehicle tire when in a first position and to release the vehicle tire when in a second position.

2. The assembly of claim 1, wherein the body is of a flexible material to facilitate movement of each of the pair of moveable arms.

3. The assembly of claim 1, wherein the body further defines a pair of handle through-holes, wherein each of the pair of handle through-holes is located adjacent one of the two handles.

4. The assembly of claim 3, wherein each of the pair of handle through-holes is located adjacent the living hinge to facilitate pivotal movement of each of the moveable arms.

5. The assembly of claim 1, wherein the body defines an axle through-hole at a location on the body for alignment with a rim through-hole of the vehicle tire.

6. The assembly of claim 1, wherein the body further defines one or more bolt through-holes spaced from one another to receive vehicle bolts at a vehicle tire mount location.

* * * * *